(12) United States Patent
Tsai et al.

(10) Patent No.: US 12,726,470 B2
(45) Date of Patent: Sep. 1, 2026

(54) CROSS-DOMAIN SECURE CONNECT TRANSMISSION METHOD

(71) Applicant: National Applied Research Laboratories, Taipei City (TW)

(72) Inventors: Tsung-Che Tsai, Taoyuan City (TW); Wei-Sheng Chen, Taoyuan City (TW); Hsi-Ching Lin, Hsinchu County (TW)

(73) Assignee: National Applied Research Laboratories, Taipei City (TW)

( * ) Notice: Subject to any disclaimer, the term of this patent is extended or adjusted under 35 U.S.C. 154(b) by 186 days.

(21) Appl. No.: 18/486,797

(22) Filed: Oct. 13, 2023

(65) Prior Publication Data

US 2024/0129291 A1 Apr. 18, 2024

(30) Foreign Application Priority Data

Oct. 14, 2022 (TW) ................................ 111139083

(51) Int. Cl.
*H04L 9/40* (2022.01)

(52) U.S. Cl.
CPC ...... *H04L 63/0823* (2013.01); *H04L 63/0876* (2013.01); *H04L 63/20* (2013.01)

(58) Field of Classification Search
None
See application file for complete search history.

(56) References Cited

U.S. PATENT DOCUMENTS

2018/0288209 A1* 10/2018 Kim ........................ H04L 67/12
2019/0296919 A1* 9/2019 Kravitz ................ H04L 9/3255
2024/0056787 A1* 2/2024 Yun ...................... H04W 8/005

FOREIGN PATENT DOCUMENTS

JP 2020532215 A * 11/2020 .......... H04W 12/069

* cited by examiner

*Primary Examiner* — Ario Etienne
*Assistant Examiner* — Mohammad Yousuf A. Mian
(74) *Attorney, Agent, or Firm* — Wang Law Firm, Inc.

(57) ABSTRACT

The invention discloses a method to set up a cross-domain DDS-secure network and then use it to transmit various kinds of data. To set up the cross-domain DDS-secure network, we first register IoT and monitor devices on the administration website. Second, we group devices based on our needs and then ask the website to generate configurations and certificates for each device. Finally, we download those files and deploy them to each device. In an extremely case, we can accomplish all operations only through a mobile device. During the system operating, all devices establish the DDS-secure connections to each other, and data will transmit on the network securely.

8 Claims, 4 Drawing Sheets

CROSS-DOMAIN SECURE CONNECT TRANSMISSION METHOD

CROSS-REFERENCE TO RELATED APPLICATION

This application claims the benefit from the Taiwan Patent Application No. 111139083, filed on Oct. 14, 2022, in the Taiwan Intellectual Property Office, the disclosures of which are hereby incorporated by reference in their entirety for all purposes.

BACKGROUND OF THE INVENTION

1. Field of the Invention

The present disclosure generally relates to a data transmission method, in particular to a cross-domain secure connect transmission method, which is capable of establishing the secure connection and performing the peer-to-peer connection or the multicast connection.

2. Description of the Related Art

Internet of things (IoT) achieves the purpose of monitoring and real-time data collection through devices or sensors that are capable of communicating with each other, and the communication method of them is usually achieved through the Internet. In detail, there may be multiple IoT devices (such as network cameras, unmanned aerial vehicles), a cloud server and a monitor device in the IoT system, where the monitor device may perform data transmission or communication with these IoT devices through the cloud server, to achieve different purposes of real-time monitoring, data collection or remote control.

In order to ensure a safe and reliable connection between the monitor device and the IoT device, in recent years, there have been many communication protocols derived from the data transmission of IoT systems, including MQTT (Message Queuing Telemetry Transport) and DDS (Data Distribution Service). MQTT is a protocol based on the publish/subscribe model under the ISO standard (ISO/IEC PRF 20922) and all the publishers (such as IoT devices) communicate with subscribers (such as monitoring terminals) through a cloud server, and unlike MQTT, DDS may avoid the intermediary of cloud server in the process of data transmission. Publishers and subscribers are directly connected in a peer-to-peer manner, thereby achieving the effects of high reliability, high performance and immediacy. Among the known application fields of DDS, it currently includes self-driving cars, power generation and air traffic control systems, etc.

When establishing DDS secure connections in the IoT system, each IoT device must have necessary information and files, which including domain ID, topic name, QoS settings, CA (Certificate Authority) certificate, identity certificate, private key, permissions files, governance file. Notes that the identity certificate and the governance and permissions files must sign by the CA firstly. Then all information and files are transmitted to the IoT device through a mobile phones with proper apps. However, in this way, once the IoT device in the system is changed, the signing process must perform again. This cumbersome procedure will increase the inconvenience for users.

In summary, the inventor of the present disclosure conceived and designed a cross-domain secure connect transmission method, to improve the deficiencies of the conventional technology, thereby enhancing the implementation and utilization in the industry.

SUMMARY OF THE INVENTION

In view of the above problems, the present disclosure is to provide a cross-domain secure connect transmission method, including registration phase, grouping phase and connection phase.

The registration phase may include: logging in to a server device by using a mobile device, and creating an account information in the server device; utilizing a communication protocol to transmit an equipment identity of a IoT device to the mobile device; sending a first registration information to the server device by the mobile device, to register the IoT device in the server device, and to create an IoT device information in the server device; and sending a second registration information to the server device by a monitor device, to register the monitor device in the server device, and to create a monitor device information in the server device; wherein the first registration information and the second registration information include the account information.

The grouping phase may include: downloading the IoT device information and the monitor device information from the server device to the mobile device; obtaining a group setting and a transmission policy setting of the IoT device information and the monitor device information by the mobile device, and sending the group setting and the transmission policy setting to the server device; generating a connection profile and an identity certificate file by the server device; and downloading the connection profile and the identity certificate file directly or indirectly from the server device by the IoT device and the monitor device.

The connection phase may include: establishing a cross-domain connection between the IoT device, the monitor device, and a server device with data distribution service.

In a preferred embodiment of the present disclosure, the cross-domain connection may include a peer-to-peer connection mode or a multicast connection mode.

In a preferred embodiment of the present disclosure, the communication protocol may be a network communication protocol connecting any two endpoints.

In a preferred embodiment of the present disclosure, the communication protocol may include Bluetooth, 802.11 WLAN protocol or 802.3 Ethernet protocol.

In a preferred embodiment of the present disclosure, the first registration information may further include the equipment identity and device description of the IoT device, and the second registration information may further include an equipment identity and device description of the monitor device.

In a preferred embodiment of the present disclosure, the connection profile and the identity certificate file may contain a digital signature.

In a preferred embodiment of the present disclosure, the IoT device may download the connection profile and the identity certificate file indirectly from the server device through the mobile device.

In a preferred embodiment of the present disclosure, the mobile device may include a smart phone, a laptop computer or a tablet computer, the server device may include a computer or a server, and the monitor device may include a computer, a laptop computer, a tablet computer, or a server.

In a preferred embodiment of the present disclosure, the connection phase may further include: transmitting image data, audio data, text data or binary data in the cross-domain connection.

DETAILED DESCRIPTION OF THE PREFERRED EMBODIMENTS

In order to facilitate the understanding of the technical features, contents and advantages of the present disclosure and the effective thereof that can be achieved, the present disclosure will be illustrated in detail below in the form of embodiments with the accompanying drawings. The diagrams used herein are merely intended to be schematic and auxiliary to the specification, but are not necessary to be true scale and precise to the configuration after implementing the present disclosure. Thus, it should not be interpreted in accordance with the scale and the configuration of the accompanying drawings to limit the scope of the present disclosure on the practical implementation.

The advantages, features, and technical methods of accomplishing the present disclosure will be more easily understood by being described in more detail with reference to the exemplary embodiments and the accompanying drawings, and the present disclosure may be implemented in different forms, so it should not be construed as being limited to the content described herein. Rather, these embodiments are provided as examples so that this disclosure will be thorough and complete, and will fully convey the aspects of the present disclosure to those skilled in the art, and the present disclosure will only be defined by the appended claims.

Figure 1:
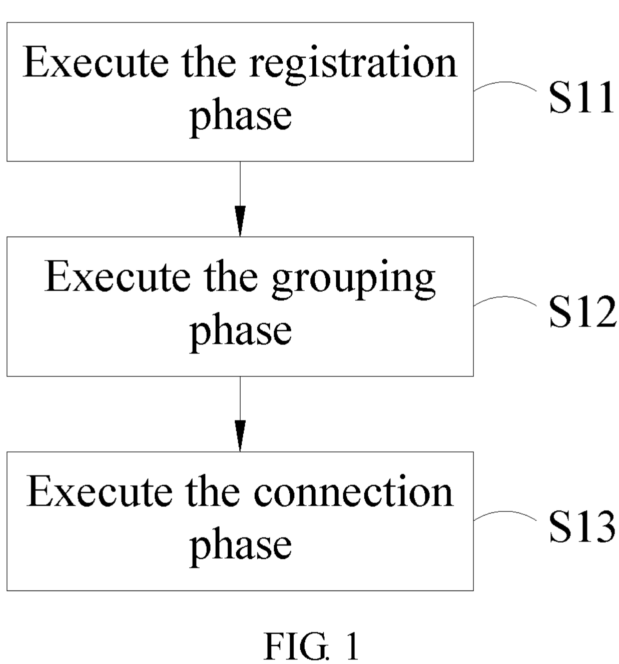
FIG. 1 is a flow diagram of the cross-domain secure connect transmission method in accordance with an embodiment of the present disclosure.

Referring to FIG. 1, FIG. 1 is a flow diagram of the cross-domain secure connect transmission method in accordance with an embodiment of the present disclosure. As shown in FIG. 1, the cross-domain secure connect transmission method of the present disclosure is mainly applied to improve the connection and transmission mechanism between the IoT device and the monitor device, so as to achieve a transmission method of secure connection. The monitor device may include a computer, a laptop computer, a tablet computer or a server, the IoT device may include any electronic device with networking function, such as network cameras, unmanned aerial vehicles or smart home appliances, etc., and the monitor device may receive data transmitted by the IoT device through the internet, or transmit a command to the IoT device for control.

Figure 3:
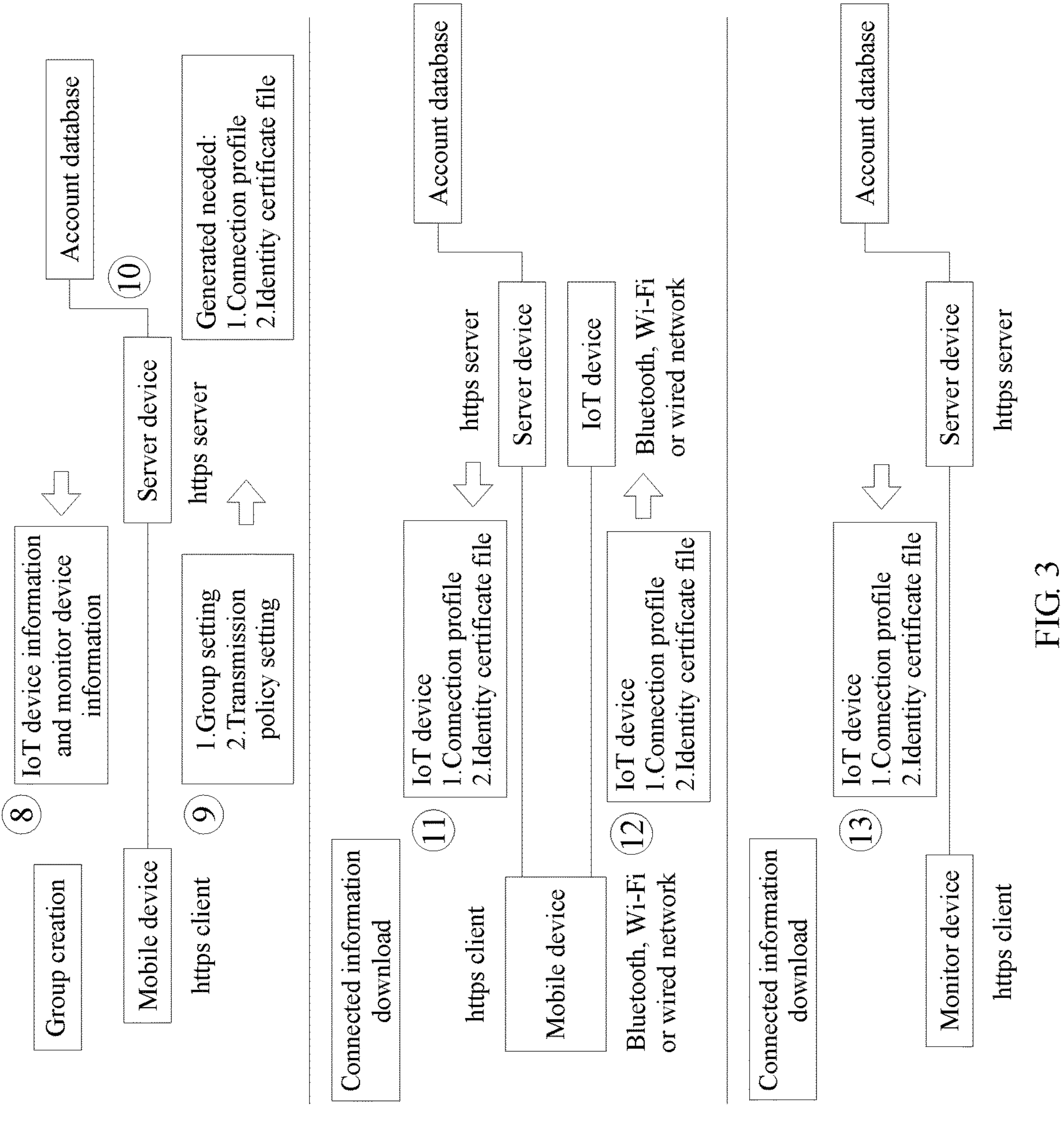
FIG. 3 is a schematic view of the grouping phase in accordance with an embodiment of the present disclosure.
Figure 4:
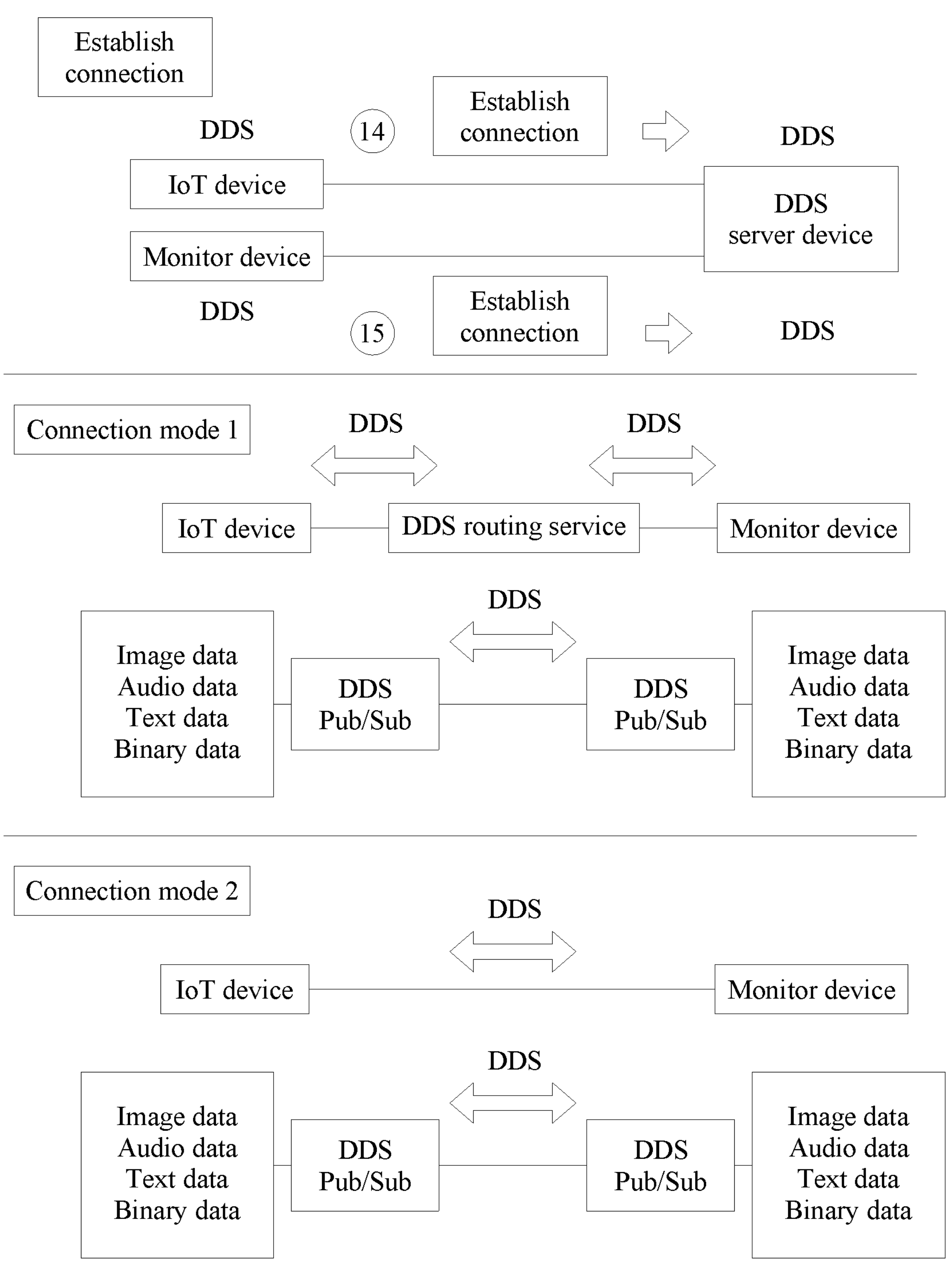
FIG. 4 is a schematic view of the connection phase in accordance with an embodiment of the present disclosure.

In the present embodiment, the cross-domain secure connect transmission method of the present disclosure may include three stages or phases as illustrated in steps S11 to S13. Step S11 is to execute the registration phase, the step S12 is to execute the grouping phase, and the step S13 is to execute the connection phase. The diagrams shown in FIG. 2 to FIG. 4 are to illustrate the detailed contents of steps S11 to S13 respectively, and it is hereby described in detail as follows.

Figure 2:
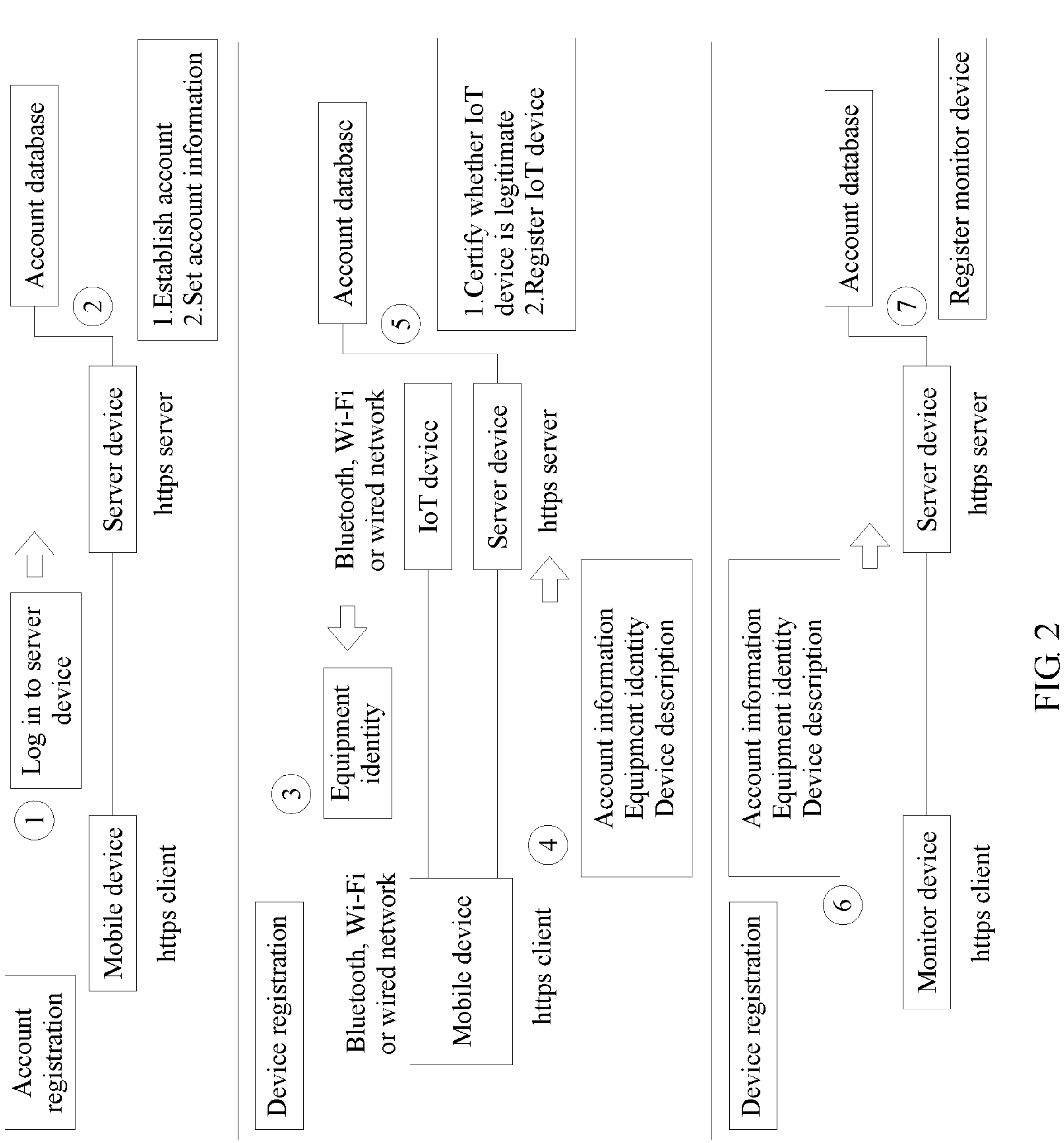
FIG. 2 is a schematic view of the registration phase in accordance with an embodiment of the present disclosure.

As shown in FIG. 2, in the cross-domain secure connect transmission method of the present disclosure, the registration phase may include two parts, i.e., the "account registration" part and the "device registration" part. In the part of "account registration", the user needs to use the mobile device to log in to a connected encryption website of the server device (hereinafter referred to as "website of the server device" for short), and to create a specific account information on the website of the server device. It can be understood that an account database may be established in the server device to store a device information related to the specific account information, and in the present embodiment, the account database may store relevant information of mobile devices, IoT devices and monitor device etc., wherein the mobile device may include a smart phone, a laptop computer, or a tablet computer.

It should be noted that, in the present disclosure, when the mobile device, the IoT device, and the monitor device communicate with each other through the internet, devices all use the network communication protocol of Hypertext Transfer Protocol Secure (Https), which add SSL/TLS on the basis of HTTP for data encryption, and may be used to protect the exchanged data from being leaked or stolen.

And in the part of "device registration", the IoT device and the monitor device need to execute a device registration operation to the server device. To describe in detail, firstly, the mobile device may use a communication protocol to connect with the IoT device, and then, an equipment identity of the IoT device may be transmitted to the mobile device, wherein the equipment identity may be a unique identification number of the IoT device, and the communication protocol used to communicate may be a network communication protocol connecting any two endpoints, and the network communication protocol includes wired communication protocol or wireless communication protocol (such as Bluetooth, 802.11 wireless local area network protocol or 802.3 Ethernet agreement).

Then, the mobile device will transmit a first registration information including the equipment identity and its device description to the website of the server device, to register the IoT device in the server device, and at the same time, the server device will also establish a corresponding IoT device information.

Then, in the part of "device registration", the monitor device may directly transmit a second registration information to the website of the server device to register the monitor device in the server device, and establish a corresponding monitor device information in the website server device. As mentioned above, the second registration information includes the equipment identity of the monitor device itself and its related device description.

Through the execution of the registration phase, the server device will store the device information of the IoT device and monitor device that is considered legitimate. Further, once the device information of the IoT device and monitor device is registered by the website of the server device, the server device may analyze and process the data transmitted by the IoT device and monitor device. However, once the IoT device or monitor device are stolen or destroyed, the original user may log in to the website of the server device to further mark the first registration information and second registration information stored therein, to ensure that the device information on the server device and the actual operation information of these devices are kept consistent.

In this way, when the stolen IoT device tries to log in to the website of the server device, the server device may determine that the login action is from an illegally accessed IoT device, and then generate a warning message or record the relevant information about this illegal access for subsequent tracking and verification.

Next, as shown in FIG. 3, the grouping phase of the present embodiment includes two parts, which are the "group creation" part and the "connected information download" part.

First, in the part of "group creation", the mobile device will download the IoT device information and the monitor device information from the website of the server device, and then the mobile device will obtain a group setting and a transmission policy setting of the IoT device information and the monitor device information, wherein the group setting is to set the IoT device and the monitor device in a same group, and the transmission policy setting may be an existing communication protocol policy, such as the DDS standard.

Then, the mobile device transmits the group setting and transmission policy setting back to the website of the server device, and the server device generates a connection profile and an identity certificate file according to the group setting and the transmission policy setting.

It should be noted that, in the present embodiment, in order to prevent the connection profile and the identity certificate file from being tampered inside the website of the server device or during transmission, the server device may execute an operation of software signature on these files, so as to ensure the correctness of the files, and the present disclosure is not limited to the method of software signature, and may also use other anti-tampering technology of asymmetric cryptography to ensure the correctness of the file data.

In addition, in the part of "connected information download" of the present embodiment, the IoT device may obtain the connection profile and identity certificate file from the website of the server device through the mobile device, and the monitor device may directly obtain the connection profile and identity certificate file from the website of the server device.

Through the execution of the grouping phase of the present embodiment, the connection profile and the identity certificate file established by the website of the server device may be downloaded to the IoT device and the monitor device respectively.

Finally, as shown in FIG. 4, the main steps of the connection phase include establishing a cross-domain connection between the IoT device, the monitor device, and the server device with data distribution service, wherein the secure connection of the cross-domain connection mode 2 can be the peer-to-peer or the multicast mode. In the secure connection mode, the IoT device and the monitor device both have public IP addresses and transmit image data, audio data, text data or binary data through the DDS standard (protocol standard of publisher/subscriber).

In addition, the cross-domain connection mode 1 also includes the secure connection in the peer-to-peer or the multicast mode, wherein the secure connection module makes the data transmission between the monitor device and the IoT device through the DDS routing service. The DDS routing service can be a software in a computer, so that the data are transmitted and received between the monitor device and the IoT device. Since the routing service is known by those skilled in technical field of computer, and the present disclosure will not repeat here.

Through the cross-domain secure connect transmission method disclosed in the present disclosure, in addition to simplifying the difficulty of setting the IoT device when connecting in cross-domain, the problem of updating the identity certificate during connecting may also be reduced. Therefore, comparing to the prior art, the present disclosure should have novelty, inventive step, and applicability in related technical field.

The above-mentioned embodiments are only to illustrate the technical concept and features of the present disclosure, and for those having ordinary skill in the art to understand the content of the present disclosure and implement the present disclosure accordingly. It should not be construed as limiting the scope of the present disclosure. It is to be construed that all changes or modifications derived from the spirit of the present disclosure are included in the scope of the disclosure.

What is claimed is:

1. A cross-domain secure connect transmission method, comprising:

a registration phase, comprising:

logging in to a server device by using a mobile device to create an account information in the server device;

utilizing a communication protocol to transmit an equipment identity of a Internet of Things (IoT) device to the mobile device;

sending a first registration information to the server device by the mobile device, to register the IoT device in the server device, and to create an IoT device information in the server device; and sending a second registration information to the server device by a monitor device, to register the monitor device in the server device, and to create a monitor device information in the server device;

wherein the first registration information and the second registration information include the account information;

a grouping phase, comprising:

downloading the IoT device information and the monitor device information from the server device to the mobile device;

obtaining a group setting and a transmission policy setting of the IoT device information and the monitor device information by the mobile device, and sending the group setting and the transmission policy setting to the server device;

generating a connection profile and an identity certificate file by the server device; and downloading the connection profile and the identity certificate file directly from the server device by the monitor device, downloading the connection profile and the identity certificate file indirectly from the server device through the mobile device by the IoT device, the connection profile and the identity certificate file established by the server device being downloaded to the IoT device and the monitor device respectively; and a connection phase, comprising:

establishing a cross-domain connection between the IoT device, the monitor device, and a server device with data distribution service according to the connection profile and the identity certificate, wherein the data distribution service uses a publish/subscribe communication protocol.

2. The cross-domain secure connect transmission method of claim 1, wherein the cross-domain connection comprises peer-to-peer connection mode or multicast connection mode.

3. The cross-domain secure connect transmission method of claim 1, wherein the communication protocol is a network communication protocol connecting any two endpoints.

4. The cross-domain secure connect transmission method of claim 1, wherein the communication protocol includes Bluetooth, 802.11 Wireless Local Area Network (WLAN) protocol or 802.3 Ethernet protocol.

5. The cross-domain secure connect transmission method of claim 1, wherein the first registration information further includes the equipment identity and device description of the IoT device, and the second registration information further includes an equipment identity and device description of the monitor device.

6. The cross-domain secure connect transmission method of claim 1, wherein the connection profile and the identity certificate file contain a digital signature.

7. The cross-domain secure connect transmission method of claim 1, wherein the mobile device includes a smart phone, a laptop computer or a tablet computer, the server device includes a computer or a server, and the monitor device includes a computer, a laptop computer, a tablet computer, or a server.

8. The cross-domain secure connect transmission method of claim 1, wherein the connection phase further comprises:

transmitting image data, audio data, text data or binary data in the cross-domain connection.

* * * * *